United States Patent
Beals (10) Patent No.: US 12,473,044 B2
(45) Date of Patent: Nov. 18, 2025

(54) MODULAR VEHICLE STRUCTURE

(71) Applicants: MAGNA INTERNATIONAL INC., Aurora (CA); Randy S. Beals, Grand Ledge, MI (US)

(72) Inventor: Randy S. Beals, Grand Ledge, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 389 days.

(21) Appl. No.: 18/011,921

(22) PCT Filed: Jul. 1, 2021

(86) PCT No.: PCT/US2021/040064
§ 371 (c)(1),
(2) Date: Dec. 21, 2022

(87) PCT Pub. No.: WO2022/006381
PCT Pub. Date: Jan. 6, 2022

(65) Prior Publication Data
US 2023/0242195 A1    Aug. 3, 2023

Related U.S. Application Data

(60) Provisional application No. 63/046,866, filed on Jul. 1, 2020.

(51) Int. Cl.
*B62D 63/02*    (2006.01)
*B60K 1/04*    (2019.01)
(Continued)

(52) U.S. Cl.
CPC .............. *B62D 63/025* (2013.01); *B60K 1/04* (2013.01); *B60L 50/60* (2019.02); *B62D 25/08* (2013.01);
(Continued)

(58) Field of Classification Search
CPC ........ B62D 63/025; B60L 50/60; B60L 50/64
See application file for complete search history.

(56) References Cited

U.S. PATENT DOCUMENTS

| | | | | |
|---|---|---|---|---|
| 4,422,685 A | * | 12/1983 | Bonfilio | B62D 65/04 296/193.04 |
| 4,881,756 A | * | 11/1989 | Kumasaka | B62D 65/04 296/193.03 |

(Continued)

FOREIGN PATENT DOCUMENTS

| | | |
|---|---|---|
| DE | 102015016954 A1 | 7/2016 |
| FR | 3082176 A1 | 12/2019 |

(Continued)

OTHER PUBLICATIONS

Foundry Alloys, Processes and Characteristics' (The Aluminum Transportation Group), May 2019 (May 2019), [online], retrieved from <URL: http://www.drivealuminum.org/wp-contenUuploads/2019/05/2.2_Castings_J.-Fourmann_Rio-Tinto-.pdf>, entire document, especially p. 40.

*Primary Examiner* — Jeffrey J Restifo
(74) *Attorney, Agent, or Firm* — Dickinson Wright PLLC (57) ABSTRACT

A modular vehicle system includes a cabin module, front end module, and rear end module. The cabin module includes a floor structure of the vehicle and has a front end and a rear end, and a plurality of panels extending upwardly from the floor structure. The front end module is configured to include the front wheels of the vehicle. The rear end module is configured to include rear wheels of the vehicle. The front end module is configured to securely attach to the front end of the cabin module, and the rear end module is configured to securely attach to the rear end of the cabin module. Various types of modules can be constructed and assembled to define various types of vehicles. The floor structure of the cabin module may include an electric vehicle (Continued)

battery, and different cabin modules may have different battery types enabling different vehicle ranges.

17 Claims, 7 Drawing Sheets

(51) Int. Cl.
| | |
|---|---|
| *B60L 50/60* | (2019.01) |
| *B62D 25/08* | (2006.01) |
| *B62D 27/02* | (2006.01) |
| *B62D 29/00* | (2006.01) |
| *B62D 65/02* | (2006.01) |
| *B60J 1/02* | (2006.01) |
| *B60R 19/24* | (2006.01) |
| *B62D 25/20* | (2006.01) |

(52) U.S. Cl.
CPC ......... *B62D 27/023* (2013.01); *B62D 29/008* (2013.01); *B62D 65/024* (2013.01); *B60J 1/02* (2013.01); *B60K 2001/0438* (2013.01); *B60R 19/24* (2013.01); *B62D 25/2009* (2013.01)

(56) References Cited

U.S. PATENT DOCUMENTS

| | | | | |
|---|---|---|---|---|
| 5,401,056 A | * | 3/1995 | Eastman | B62D 47/006 |
| | | | | 296/193.03 |
| 5,882,064 A | * | 3/1999 | Emmons | B62D 23/00 |
| | | | | 296/193.04 |
| 5,934,397 A | * | 8/1999 | Schaper | B62D 63/025 |
| | | | | 180/65.245 |
| 6,059,058 A | * | 5/2000 | Dower | B60L 50/52 |
| | | | | 180/65.265 |
| 6,817,655 B2 | * | 11/2004 | Durand | B62D 47/006 |
| | | | | 296/193.03 |
| 6,896,319 B1 | * | 5/2005 | Huang | B62D 25/02 |
| | | | | 296/193.06 |
| 6,923,282 B2 | * | 8/2005 | Chernoff | B60L 50/66 |
| | | | | 180/65.265 |
| 7,594,561 B2 | * | 9/2009 | Hass | F41H 7/048 |
| | | | | 296/190.04 |
| 7,766,388 B1 | * | 8/2010 | Marino | B62D 65/00 |
| | | | | 280/781 |
| 8,950,530 B2 | * | 2/2015 | Niedzwiecki | B60K 6/46 |
| | | | | 280/33.998 |
| 9,845,123 B2 | | 12/2017 | Saskatchewan | |
| 10,668,926 B2 | * | 6/2020 | Birnschein | B60R 16/0231 |
| 10,780,930 B1 | * | 9/2020 | Kentley-Klay | B62B 3/0612 |
| 11,338,864 B2 | * | 5/2022 | Carldén | B62D 27/023 |
| 11,447,188 B2 | * | 9/2022 | Schmidt | B62D 27/023 |
| 11,702,162 B2 | * | 7/2023 | Harmon | B62D 21/11 |
| | | | | 296/193.04 |
| 11,807,323 B2 | * | 11/2023 | Claesson | B62D 63/025 |
| 11,858,571 B2 | * | 1/2024 | Harmon | B62D 21/03 |
| 11,987,268 B2 | * | 5/2024 | Claesson | B60W 60/0015 |
| 12,011,962 B2 | * | 6/2024 | Harmon | B62D 63/025 |
| 12,037,048 B2 | * | 7/2024 | Letendre | B62D 29/001 |
| 12,084,038 B2 | * | 9/2024 | Sjödin | B60W 50/0097 |
| 12,168,489 B2 | * | 12/2024 | Choi | B60K 1/00 |
| 2010/0230192 A1 | * | 9/2010 | Riley | B60K 6/52 |
| | | | | 180/65.28 |
| 2016/0129958 A1 | | 5/2016 | Saskatchewan | |
| 2023/0092312 A1 | * | 3/2023 | Choi | B60K 1/04 |
| | | | | 296/193.04 |
| 2023/0242195 A1 | * | 8/2023 | Beals | B62D 65/04 |
| | | | | 180/65.1 |
| 2025/0019021 A1 | * | 1/2025 | Becirbasic | B62D 21/10 |

FOREIGN PATENT DOCUMENTS

| | | |
|---|---|---|
| WO | 2013156639 A1 | 10/2013 |
| WO | 2019101815 A1 | 5/2019 |
| WO | 2020109498 A1 | 6/2020 |

* cited by examiner

MODULAR VEHICLE STRUCTURE

CROSS-REFERENCE TO RELATED APPLICATIONS

This U.S. National Stage Patent Application claims the benefit of PCT International Patent Application Serial No. PCT/US2021/040064 filed Jul. 1, 2021 entitled "MODULAR VEHICLE STRUCTURE" which claims the benefit of U.S. Provisional Patent Application Ser. No. 63/046,866 filed on Jul. 1, 2020, and titled "Modular Vehicle Structure", the entire disclosures of which are hereby incorporated by reference.

TECHNICAL FIELD

The present disclosure relates to automotive vehicle structures. More particularly, the present disclosure relates to a modular vehicle structure system.

BACKGROUND OF THE DISCLOSURE

Automotive vehicles and electric vehicles (collectively referred to as vehicles) have various sizes and shapes corresponding to the needs of the vehicle operator or owner. For example, traditional passenger vehicles may include sedans, wagons, vans, trucks, or the like. Commercial vehicles may also have different body styles and shapes. The variety of vehicle types available typically requires a variety of vehicle support structures for defining the size and shape of the vehicle and for mounting the various vehicle components thereto.

For example, traditional vehicles include a front section that includes an engine, drivetrain components, a front axle and wheels, a battery, and the like. Traditional vehicles include a passenger compartment in which seats and interior trim components are mounted. The rear portion of a vehicle traditionally includes storage space as well as a rear axle. Of course, there are many other components mounted through the vehicle. As different vehicles have different requirements, different vehicles may include different underlying support structure.

For ease of assembly and manufacture, many manufacturers may utilize a vehicle platform in which a common underlying support structure is used for a variety of vehicles. For example, a wagon may use the same sub-frame as a sedan, and they may further use the same engine, axles, etc. The vehicles may be differentiated by changing the upper body panels and upper frame portion that is mounted to the subframe. However, the various components must still be installed to the frame during the assembly process, which can be time-consuming. Additionally, over time user needs/desires typically require a new platform or re-designed platform to correspond to changing consumer demand and preferences.

Modular vehicle concepts may include a "skateboard" design in which a battery and the front and rear wheels are provided on a generic bottom structure, and an upper pod may be attached to the bottom structure to define the interior space for passengers or cargo and to change the overall appearance of the vehicle.

However, in the above approach, while different upper body shapes are possible (car, van, delivery truck), the size and shape of the front and rear portions, and the battery tray, remain common and fixed, and are not easily modifiable without providing an entirely different complete bottom portion.

Due to increasing variety of consumer demand, there remains a need for a system that easily accommodates a variety of body types and styles, including a variety of battery types and capacities in the electric vehicle segment.

SUMMARY OF THE INVENTION

A system for modular assembly of a vehicle is provided. The system includes: a cabin module of a vehicle having a first end and a second end; a front end module having a first end and a second end; a rear end module having a first and a second end; wherein the first end of the front end module defines a front end of the system, and the second end of the rear end module defines a rear end of the system; wherein the second end of the front end module is configured to securely mate with the first end of the cabin module; wherein the first end of the rear end module is configured to securely mate with the second end of the cabin module; wherein the cabin module includes a floor structure extending between the first and second end, and a plurality of panels extending upwardly from the floor structure; wherein the front end module includes a front support structure; wherein the rear end module includes a rear support structure; wherein the cabin module is securely attached to the front support structure and the rear support structure via attachment interfaces therebetween.

In one aspect, the front support structure includes a pair of front rails extending in a fore and aft direction, a bumper beam extending laterally between the front rails, a rear beam extending laterally between the front rails, and a plurality of panels extending upwardly from at least the front rails; and the rear support structure includes a pair of rear rails extending in a fore and aft direction, a rear bumper beam extending laterally between the rear rails, a lateral beam extending laterally between the rear rails, and a plurality of panels extending upwardly from at least the rear rails.

In one aspect, the cabin module includes a battery for an electric vehicle.

In one aspect, the battery is part of the floor structure.

In one aspect, the panels are made of high pressure vacuum die cast aluminum.

In one aspect, the cabin module includes a plurality of stubs extending forwardly and rearwardly therefrom, wherein the stubs are received in corresponding cavities of the front end module and the rear end module, respectively.

In one aspect, the floor structure of the cabin module defines a bottommost portion of the system at the location of the cabin module.

In one aspect, wherein the front end module and rear end module are configured to include front wheels and rear wheels, respectively, wherein the front end module and rear end module are separate from each other, and wherein the cabin module joins the front end module to the rear end module.

In another aspect, a method of assembling a modular vehicle system is provided. The method includes: providing a cabin module having a front end and a rear end, wherein the cabin module includes a floor structure defining a bottom of the module vehicle system and a plurality of panels extending upwardly from the floor structure; providing a front end module having a front support structure, the front end module configured to include front wheels of the vehicle; providing a rear end module having a rear support structure, the rear end module configured to include rear wheels of the vehicle; attaching a rear end of the front end module to the front end of the cabin module; attaching a front end of the rear end module to the rear end of the cabin module; wherein the cabin module, front end module, and rear module combine to define an overall frame structure of the system.

In one aspect, the cabin module includes a battery for an electric vehicle.

In one aspect, the floor structure includes the battery.

In one aspect, the cabin module does not include wheels.

In one aspect, one of the front module or the rear module includes a motor for driving the front wheels or rear wheels.

In another aspect, a modular electric vehicle includes: a cabin module having a front end and a rear end; a front module having a front end and a rear end; a rear module having a front end and a rear end; wherein the cabin module, front module, and rear module are separate modules and are securely mated with each other via a plurality of attachment interfaces therebetween, wherein the front end of the cabin module mates with the rear end of the front module, and the rear end of the cabin module mates with the front end of the rear module; wherein the cabin module includes a lower platform defining a passenger compartment, wherein the lower platform includes a battery of the electric vehicle; wherein the separate front module and rear module each include wheels, such that the wheels are separate and modular relative to the cabin module.

In one aspect, the cabin module, front module, and rear module each include support structure such that each module is self-supporting.

In one aspect, the attachment interfaces include a stub projecting from one of the modules that is received in a recess of an adjacent module to fixedly secure the modules together.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
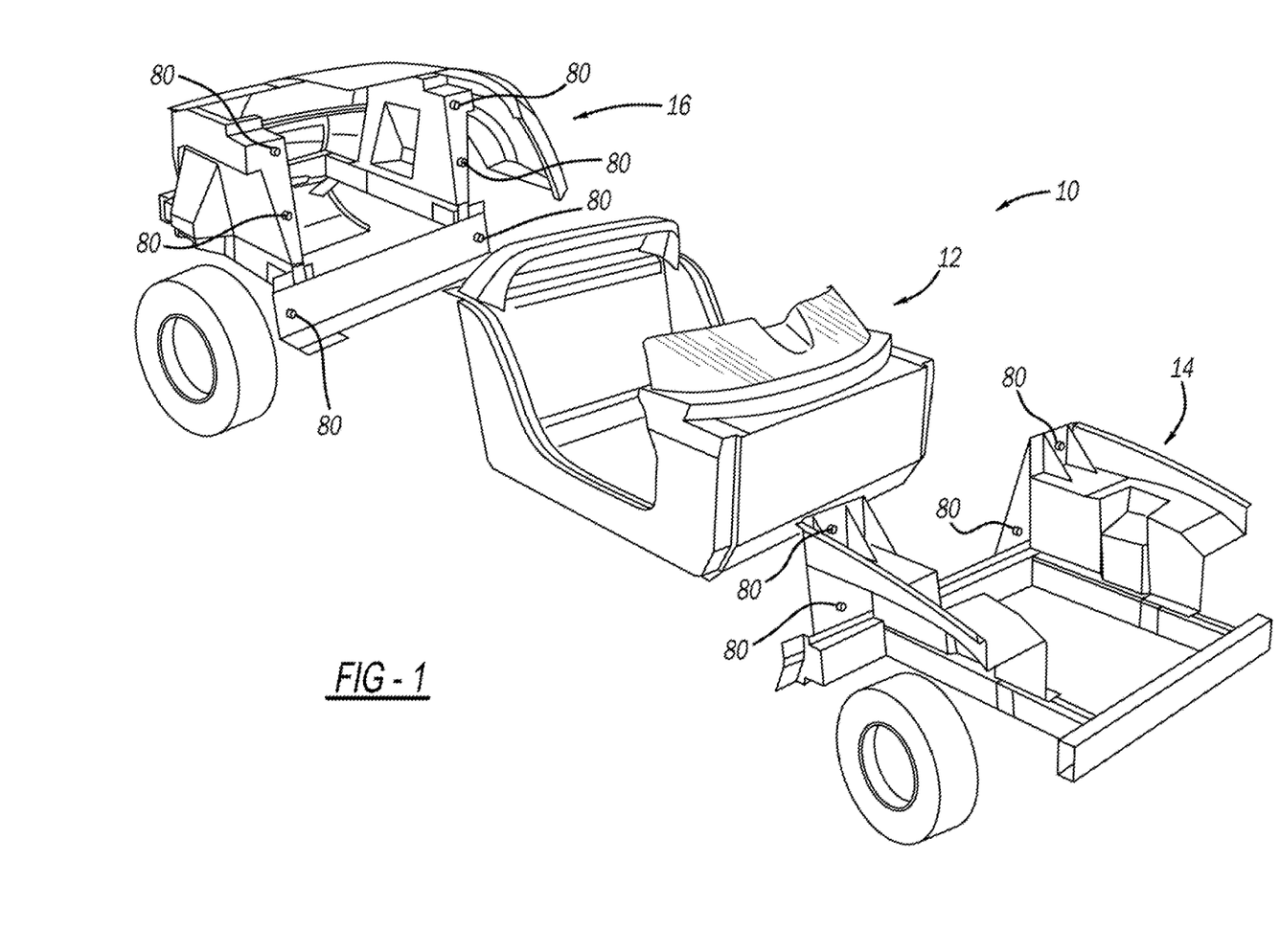
FIG. 1 is an exploded view of a modular vehicle system showing a cabin module disposed between a front end module and a rear end module in accordance with an aspect of the disclosure.

Referring to FIG. 1 and the following description, a modular vehicle structure system 10 for accommodating various vehicle types, in particular for electric vehicles, is provided. The system 10 may be used for electric vehicles, conventional combustion engine vehicles, hybrid vehicles, and the like. For purposes of discussion, electric vehicles will generally be described. However, it will be appreciated that the disclosure is not necessarily limited to electric vehicles.

As shown in FIG. 1, the system 10 may include a cabin module 12, a front end module 14, and rear end module 16, which are configured to securely mate with each other to define an overall vehicle structure. The cabin module 12 is disposed between the front module 14 and the rear module 16 in a longitudinal direction, which generally corresponds to the fore-and-aft direction of the vehicle or travel direction of the vehicle. The cabin module 12, front end module 14, and rear end module 16 can provide various functionality to the end user of the vehicle, depending on the particular needs of the user.

In one aspect, the cabin module 12 is arranged to provide seating to passengers and to provide access to various interior vehicle controls. The cabin module may thereby include a variety of passive and/or active safety systems associated with the type of passenger seating and in accordance with applicable safety standards according to the intended locality of the vehicle. A steering system, control panels, HVAC controls, entertainment controls, and the like may be disposed within the cabin module 12 to be accessed by the driver and/or passengers of the vehicle. It will be appreciated that references to a driver and steering wheel made herein are in reference to vehicles that are at least partially controlled by a vehicle user, but that the present disclosure is not limited to such vehicle driving arrangements. For example, the present disclosure is also applicable to self-driving vehicles or the like. In such cases, references to a steering wheel or other steering controls and/or a driver may be interpreted as other control systems or interfaces and/or other passenger types.

The front module 14 may include an electric motor, and engine, a front axle, front wheels, and/or the like. The front module may alternatively include a front trunk or "frunk" or other cargo space in addition to or as an alternative to the components listed above.

The rear module 16 may include a rear axle, rear wheels, cargo space, and/or the like. The rear module 16 may also include other components such as an electric motor or components described above with respect to the front module 14.

The front module 14 is sized and arranged to mate with a front end of the cabin module 12. Similarly, the rear module 16 is sized and arranged to mate with the rear end of the cabin module 12. A rear end of the front module 14 is sized and arranged to mate with the front end of the cabin module 12. A front end of the rear module 16 is sized and arranged to mate with the rear end of the cabin module 12. The front and rear ends of the cabin module 12, front module 14, and rear module 16 may also be referred to as first and second ends.

The system 10 is configured to accommodate a variety of cabin designs. The system is further configured to accommodate a variety of battery sizes to accommodate a variety of ranges. Additionally, the system 10 may be configured for all-wheel drive (AWD) or front-wheel drive (FWD) depending on the respective transmission components of the front module 14 and/or rear module 16.

The modules of the system 10 may be attached via a plurality of corresponding attachment points, which will be described in further detail below. Some modules may have attachment points that are unused, depending on the particular configuration of the corresponding mating module. For example, the cabin module 12 may have a pair of upper attachment points that are not use when a low-profile rear module 16 is used. Regardless, the attachment points that are used are configured to securely join the modules together, such that various loads applied to the system 10 may be distributed. The particular arrangement and robustness of various attachment points may vary depending on the determined stress and loads that occur at various attachment points. The type of attachment mechanism and the specific distribution of the attachment mechanism may be determined via computer modeling and testing.

The modules 12, 14, 16 may each be constructed of a combination of steel and aluminum components joined together to provide the load-bearing structure as well as the shape and styling of the modules 12, 14, 16. In one aspect, the modules may include various panels formed of High Pressure Vacuum Die Casting (HPVDC) aluminum, which may provide a contoured and tailored shape for the aluminum material. In one aspect, he modules may include a variety of interconnected steel beams for structural support. In one aspect, the steel may be DP580 (dual phase steel) and the aluminum may be 6000 series aluminum. Other materials may be used for providing structural support and/or shape and styling.

Figure 2:
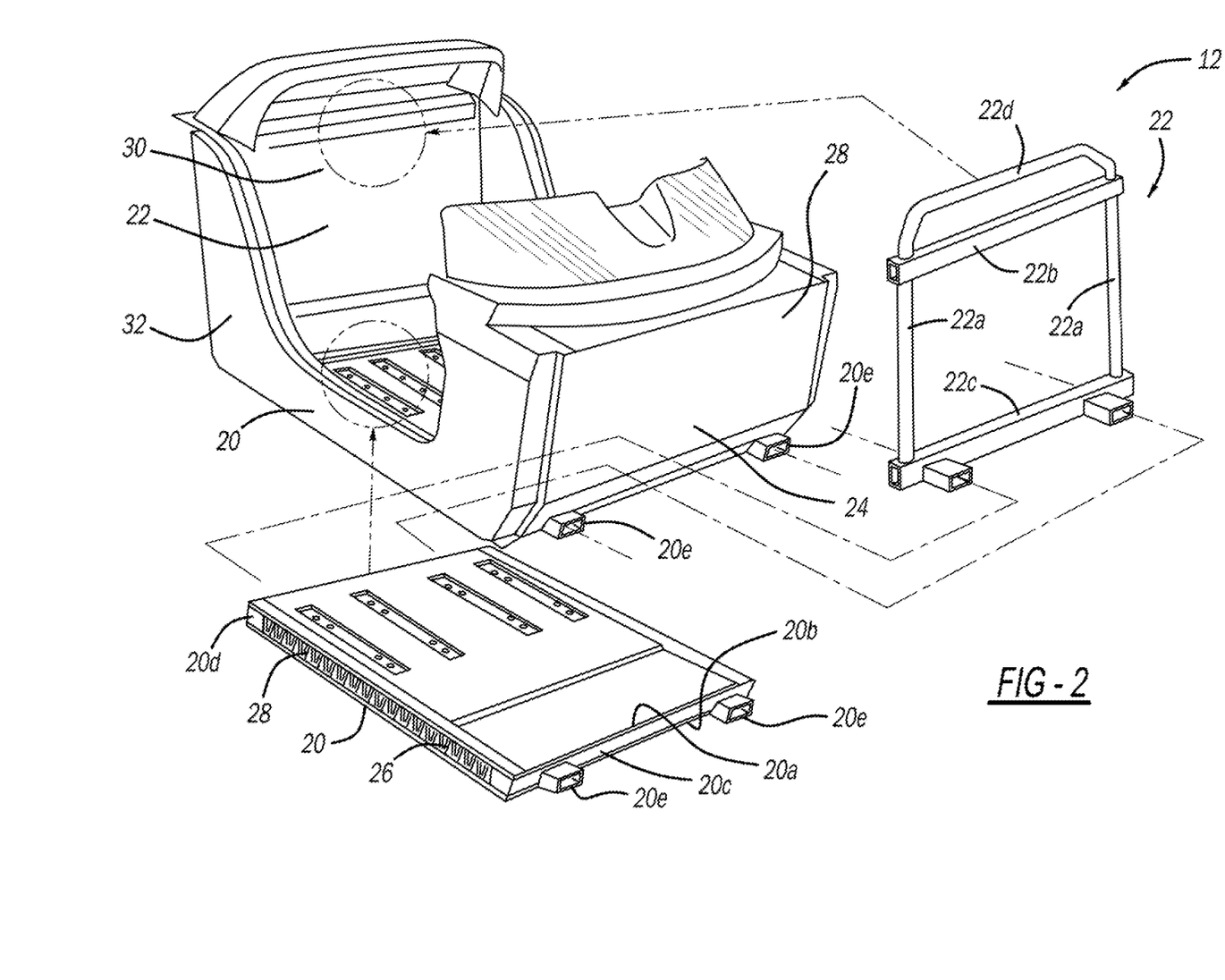
FIG. 2 illustrates the cabin module in accordance with an aspect of the disclosure.

With reference now to FIG. 2, one aspect of the cabin module 12 is shown. The cabin module 12 may include a floor structure 20, a rear structure 22, and a front structure 24. The floor structure 20 may include a battery tray 26. The battery tray 26 may be configured to house a battery 28 of the system 10. The battery tray 26 may accommodate different battery sizes for providing different ranges. The battery tray 26 may also be sized and arranged to hold a specific battery size, with different trays 26 being chosen to accommodate different ranges.

The floor structure 20 and battery tray 26 may be the same component, with the structure that supports the passengers and other components of the cabin module 12 also housing the batteries. In one aspect, with a battery size that is smaller than the floor structure 20, the floor structure 20 may include a cavity that receives and supports a battery module, such that the battery tray 26 and floor structure 20 combine to define the lower support of the cabin module 12.

In another aspect, the floor structure 20 may not include a battery, for example for non-electric vehicles. The floor structure 20 may be in the form of an aluminum extrusion or aluminum sheet.

With reference to the rear structure 22 of the cabin module 12, the rear structure 22 may be arranged generally vertically relative to the fore-and-aft horizontal direction of the vehicle. The rear structure 22 may include a pair of vertical beams 22a on opposite lateral sides of the rear structure 22. The beams 22a may extend vertically between an upper lateral support 22b and a lower lateral support 22c. The upper and lower lateral supports 22b, 22c may be in the form of steel beams with closed cross-sections, which may also be referred to as tubes. The beams 22a may also be in the form of tubes, and may also be made of steel.

The rear structure 22 may further include an upper bent portion 22d. The upper bent portion 22d may extend upwardly and laterally across the top of the rear structure 22. The upper bent portion 22d may be in the form an aluminum tube that is welded to the rear structure 22.

It will be appreciated that other support structure arrangements may be used for the rear structure 22. For example, additional tubes or beams may be added, or different cross-sectional shapes may be used for each of the tubes or beams.

The rear structure 22 provides structural support for the vehicle, and further provides a robust support structure for mating with the rear module 16. The rear structure 22 may also provide protection from vehicle collisions, accidents, roll-overs, and/or the like. The rear structure 22 may also provide support for the floor structure 20, which is attached and secured to the rear structure 22.

Turning again to the floor structure 20, the floor structure 20 may include upper and lower sheets 20a, 20b that extend generally horizontally and are vertically spaced from each other, thereby creating an interior space in which the vehicle battery components may be disposed. The floor structure 20 further includes front and rear beams 20c, 20d that extend laterally across the vehicle. The floor structure 20 may also include for-and-aft extending side beams 20e disposed on opposite lateral sides of the floor structure 20 and extending between the front and rear beams 20c, 20d.

The front beam 20c may include a pair of stubs 20e that are sized and arranged to mate with corresponding structure of the front end module 14. The rear beam 20d may also include stubs sized and arranged to mate with corresponding structure of the rear end module 16. For example, the front end module 14 and the rear end module 16 may each include openings or recesses that are sized and arranged to receive the stubs of the cabin module 20.

In an alternative approach, the floor module 20 may include recesses or the like rather than the stubs, with the front module 14 and the rear module 16 include the stub structure, which may be received in the corresponding recesses of the cabin module 12. In another aspect, the cabin module 12 may include both stubs and recesses, and the front module 14 and rear module 16 may include stubs and recesses having a corresponding pattern/spacing such that are inserted/received in the opposite structure that is disposed on the cabin module 12.

The cabin module 12 may further include a front panel 28, and rear panel 30, and side panels 32. The front panel 28 may be sized and arranged to extend laterally across the vehicle body. The front panel 28 may be attached at a bottom portion thereof to the floor structure 20, such that the front panel 28 extends upwardly from the front of the floor structure 20. More particular, the front panel 28 may extend upwardly from the front beam 20c of the floor structure 20.

The rear panel 30, similarly, may be attached at a bottom portion thereof to the floor structure 20, extending upwardly from the rear beam 20d. The side panels 32 may extend upwardly from the side beams 20e of the floor portion. The shapes of the panels of the cabin module 12 may be varied to account for different stylistic designs.

The panels 28, 30, and 32 may be made of HPVDC aluminum and may be specifically sized to form the desired body shape of the cabin module. The panels 28, 30, 32 may combine to define various portions of the body structure, such as hinge pillar, a-pillar, b-pillar, c-pillar, roof rails, rocker rail, and the like.

The panels 28, 30, 32 and other structure of the system may be welded together via resistance spot welding, element welding between steel and aluminum, or other welding methods. In another approach, the various structure of the system may be joined together via self-piercing rivets (SPR), which may be beneficial in instances where the different materials may not be susceptible to welding. Other attachment methods may also be used to secure the panels to the or other components of the cabin module 12 together, depending on various load requirements.

It will be appreciated that various modifications may be made to the cabin module 12 to allow for tailoring the cabin module to specific vehicle needs or for aesthetic purposes. The connection points between the modules may be arranged to be consistent between different types of modules to allow for the modular assembly of the system 10. For example, the location of the stubs 20e may be the same across different cabin module 12 styles, such that one type of cabin module 12 could be removed and replaced with another cabin module 12 while fitting with the original front module 14 and rear module 16.

Figure 3:
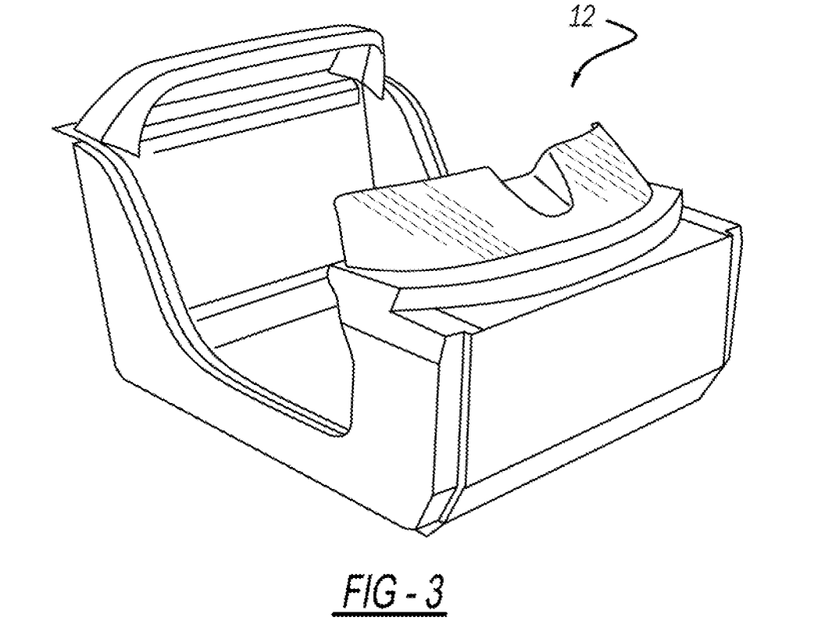
FIG. 3 illustrates another view of the cabin module in accordance with an aspect of the disclosure.
Figure 4:
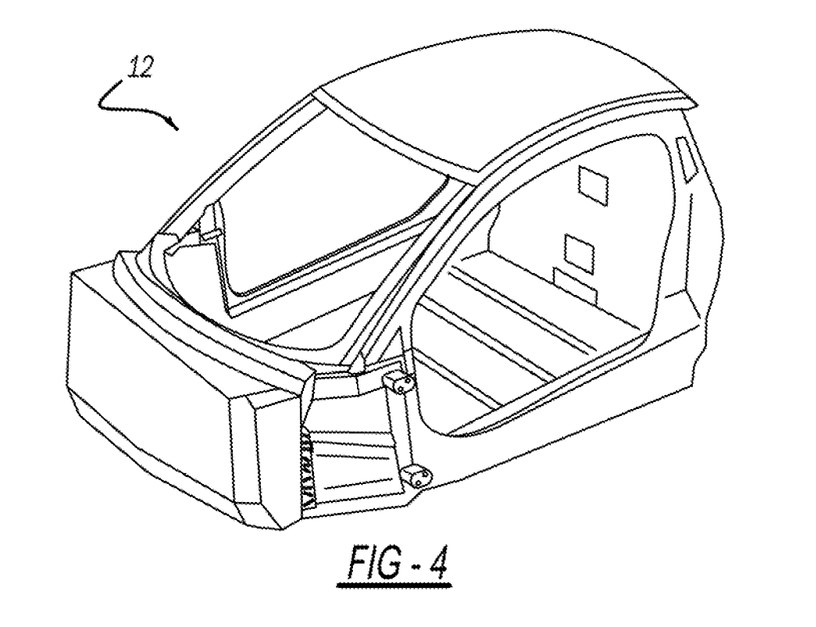
FIG. 4 illustrates another example of a cabin module in accordance with an aspect of the disclosure.
Figure 5:
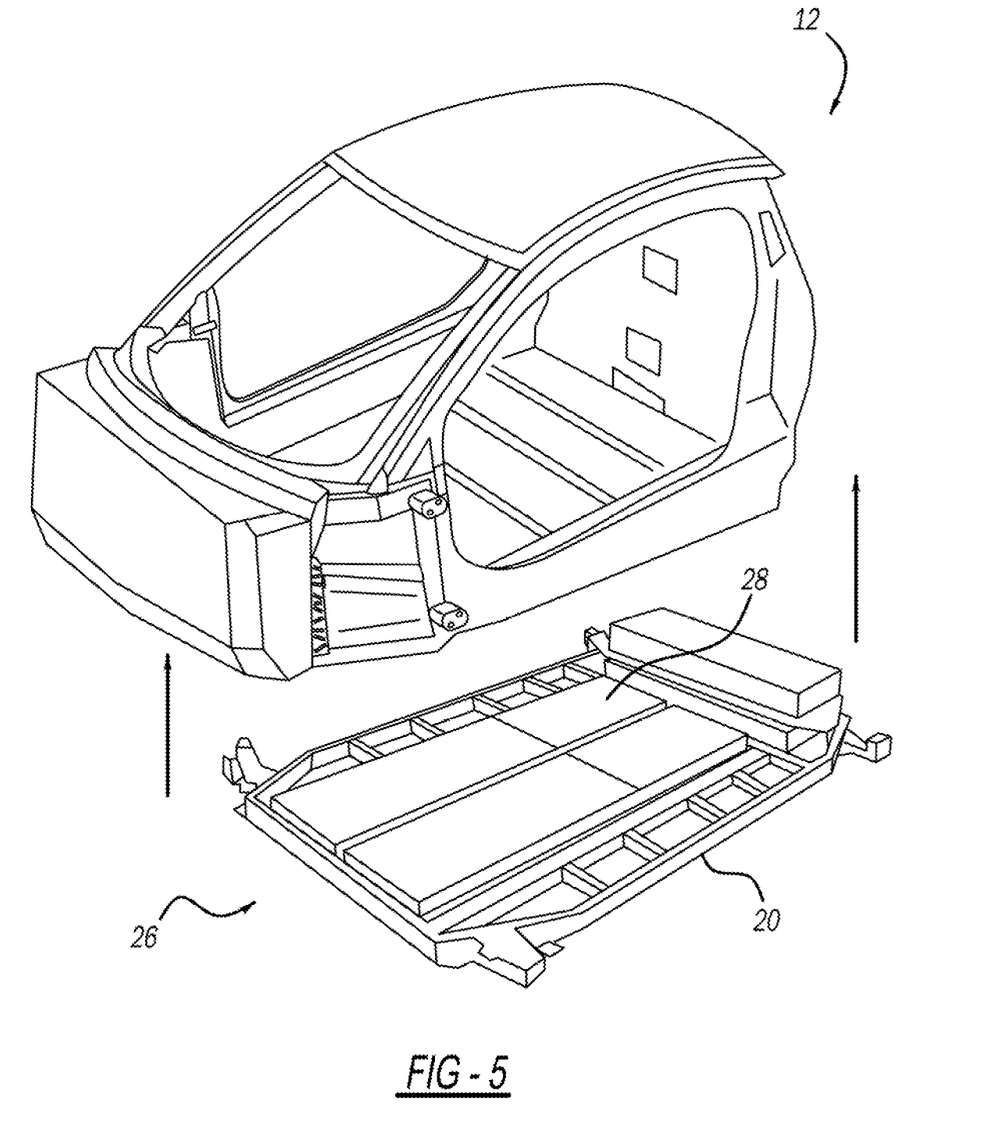
FIG. 5 illustrates another view of the cabin module of FIG. 4 in accordance with an aspect of the disclosure.
Figure 6:
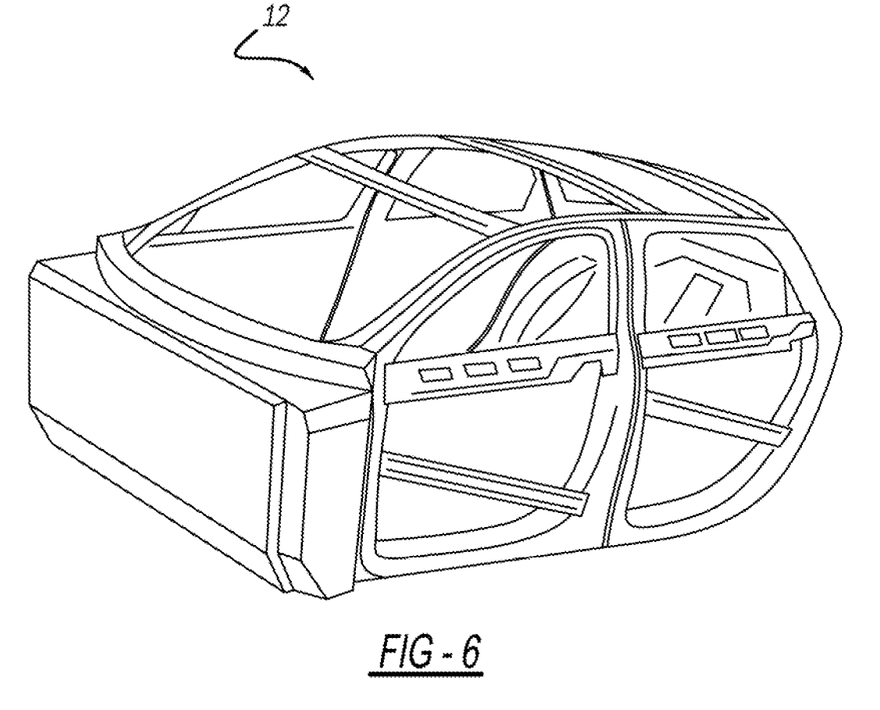
FIG. 6 illustrates another view of a cabin module in accordance with an aspect of the disclosure.

The cabin module 12 shown in FIGS. 2 and 3 may be used as a two-door sport vehicle, with a battery range of 250 km (155 miles). As shown in FIGS. 4-6, other styles of cabin module 12 include a two-door sedan with a range of 250 km (FIG. 4-5), or a four-door sedan with a range of 350 km (FIG. 6).

These alternative cabin module styles illustrate how different body styles or battery sizes may be used to address different consumer needs. Each of these cabin modules 12 may be attached to front modules 14 and rear modules 16. The same front module 14 may be used for a variety of cabin module 12 styles. Similarly, the same rear module 16 may be used for a variety of cabin module styles. The above description regarding the cabin module 12 may be applicable to the various types of cabin module styles.

Figure 7A:
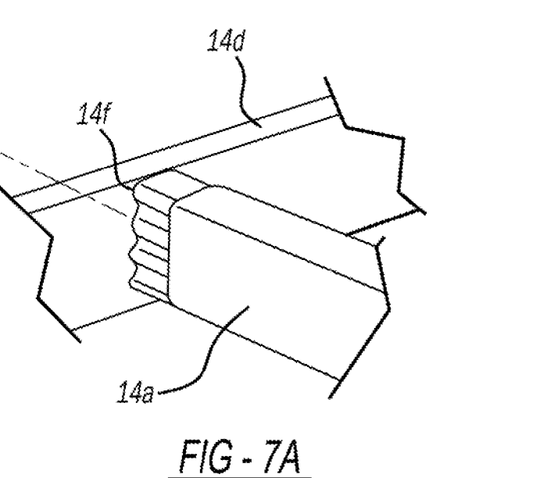
FIGS. 7A-7C illustrate the front end module in accordance with an aspect of the disclosure.
Figure 7B:
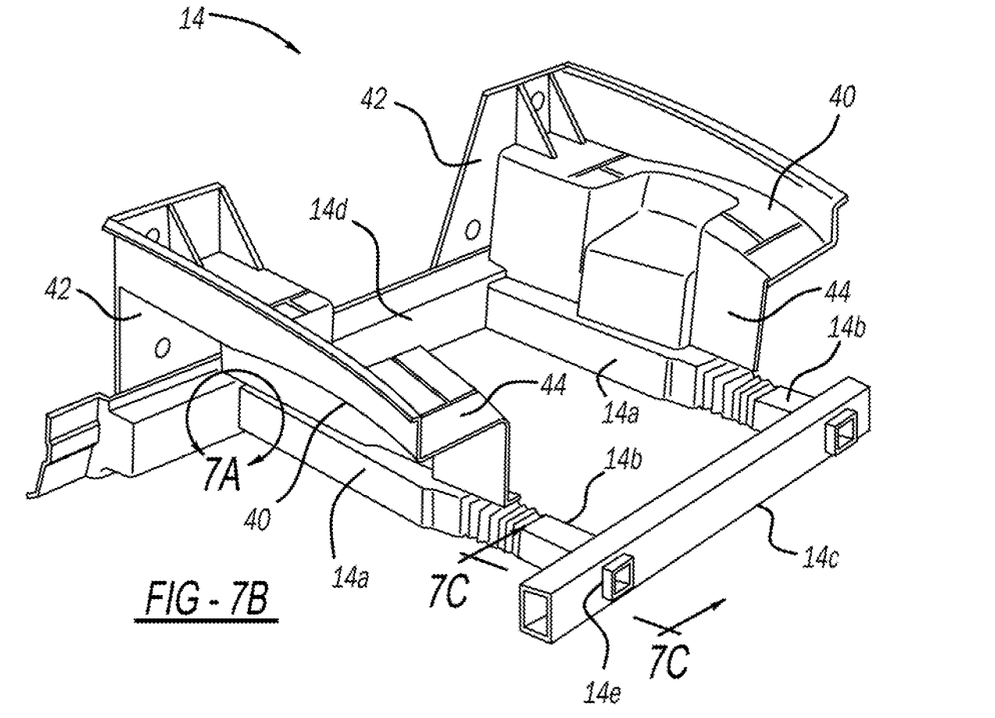
Figure 7C:
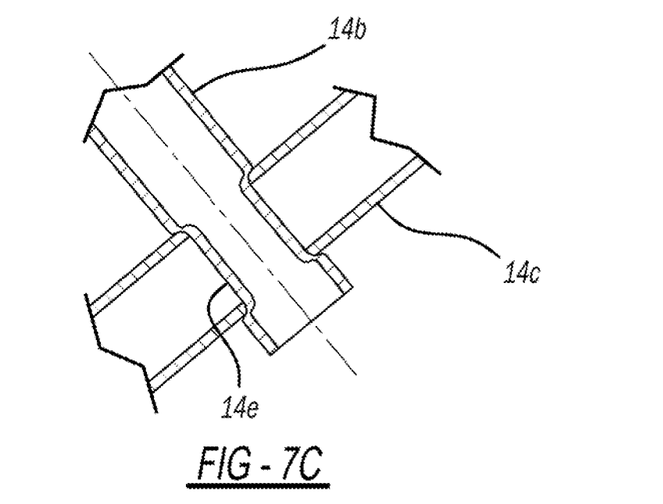

With reference now to FIGS. 7A-7C, front end module 14 is shown in further detail. A pair of front rails 14a, having front ends 14b, are disposed on opposite lateral sides of the front end module 14, and extend generally in the fore-and-aft direction. Front rails 14a may also be described as side rails of the front module 14 because they are disposed on opposite lateral sides. A bumper beam 14c extends laterally across the module 14 between the front rails 14a at a front end of the front end module 14. A rear beam 14d extends laterally across module 14 between the front rails 14a at a rear end of the front end module 14.

Bumper beam 14c may be in the form of a tubular or closed-cross-section structure. Bumper beam 14c may be made from 6000 series aluminum, and may be welded to the front rails 14a, which may be DP580 steel. The bumper beam 14c may include a passthroughs or recess 14e into which the front ends of the front rails 14a are received. Similarly, the rear beam 14d may include a passthroughs or recess 14f on a front-facing surface thereof into which the rear ends of the front rails 14a are received. In one aspect, the rear beam 14d may include recesses, similar to recesses 14f, that receive the stubs of the cabin module 12, described above. As described above, the front module 14 may include stubs that are received in recesses of the cabin module 12. In such an arrangement, the stubs may extend rearwardly from the rear beam 14d. The stubs/recesses described herein through the specification provide an attachment interface between modules, and therefore the stubs or recesses, or other attachment mechanism, may be referred to generally as an attachment interface. The various beam structures may be secured to each other via a welding process in one aspect. Other securement mechanisms to fix one beam to another may also be used.

The front end module 14 is sized and configured to operate similarly to the front portion of a traditional vehicle. Thus, the vehicle frame structure of the front end module 14 is configured to withstand certain impacts, with the support frame crumpling or buckling as designed, such as via an impact to the bumper beam 14c. The specific crumple zones or stiffness of the support structure may be tailored depending on the particular design needs of the vehicle.

The front end module 14 further includes various panels 40 attached to the frame components described above. In one aspect, a pair of side panels 40 are disposed on opposite lateral sides of the front end module 14. The side panels 40 may be made from HPVDC aluminum and may be shaped and tailored to a desired shape. The side panels 40 may extend upwardly from the front rails 14a and the rear beam 14d. Similar to the cabin module 12, which may have different stylistic arrangements, the front module 14 likewise may have various appearances based on the appearance of the side panels 40. One front module 14 may be removed and may be replaced by another front module 14 on the same cabin module, for example, to change the appearance, and also the functionality depending on the arrangement of the front module 14.

The side panels 40 may include a rear portion 42 and a front portion 44. The rear portion 42 may combine with a corresponding portion of the cabin module 14 to define the hinge pillar of the vehicle. The front portion 44 may define the front wheel wells of the vehicle.

Various other trim portions and the like may be attached to the front end module 14 to define the overall shape and appearance of the vehicle. Additionally, other vehicle components, such as motors, wheels, etc. may also be attached to the front end module 14. In one aspect, the front module 14 may be enclosed, similar to a traditional rear section of a vehicle, in order to define a storage compartment or "frunk" type structure.

Figure 8A:
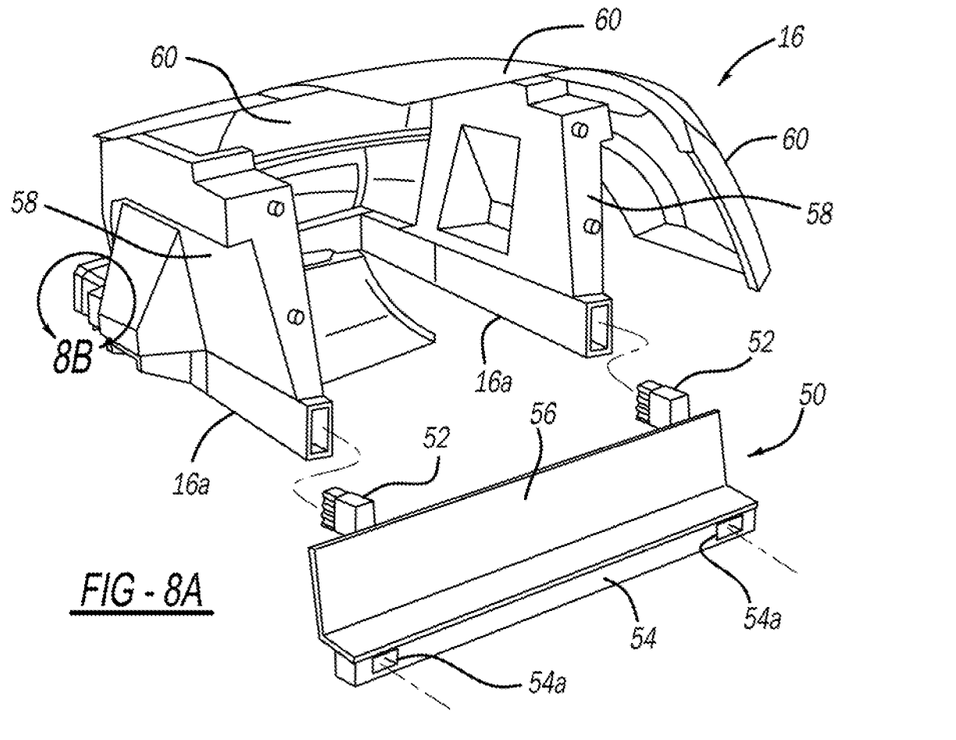
FIGS. 8A-8B illustrates the rear end module in accordance with an aspect of the disclosure.
Figure 8B:
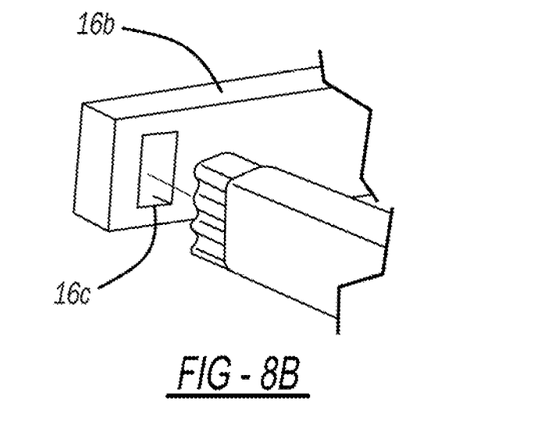

With reference now to FIGS. 8A-8C, the rear end module 16 is shown in further detail. The rear end module 16 includes a pair of rear rails 16a extending in the fore-and-aft direction and disposed on laterally opposite side of the rear end module 16. The rear rails 16a may also be referred to as side rails of the rear module 16, because they are on opposite lateral sides of the rear module 16. The rear module 16 further includes a rear bumper beam 16b extending laterally across the rear module 16. The rear bumper beam 16b may include recesses 16c for receiving the rear ends of the rear rails 16a. The recesses 16c may also be in the form of pass-through sections, similar to recesses 14e described above. In another aspect, the rear bumper beam 16b may include stubs that are received in corresponding recesses of the rear rails 16a.

The rear end module 16 may further include a transition section 50 that is attached to the front ends of the rear rails 16a and configured for mating with the cabin module 12. The transition section 50 includes a pair of upper stubs 52. The upper stubs 52 are disposed at the top of the transition section 50 and are sized and arranged to be received in corresponding recesses formed in the front ends of the rear rails 16a. Similar to other recess and stub arrangements described above, the opposite arrangement may also be used, or a combination of recesses and stubs at different locations may be used.

The transition section 50 further includes a lateral beam 54 extending laterally across the transition section 50. The lateral beam 54 is disposed below the upper stubs 52. The lateral beam may include a pair of recesses 54a at opposite lateral sides of the lateral beam 54 that face forward. The recesses 54a are sized and arranged to receive corresponding rearwardly extending stubs of the cabin module 12. This arrangement may also be reversed, such that the lateral beam have forwardly projecting stubs that are received in recesses of the cabin module 12 structure.

The transition section 50 may further include a close out panel 56 that extends upwardly from the lateral beam 54 and that also extends laterally across the transition section 50. The close out panel 56 may be aluminum and may be configured for being welded to the cabin module 12.

The rear end module 16 further includes additional side panels 58 that extend upwardly from the rear rails 16a. The side panels 58 may be HPVDC aluminum structures that may be shaped and tailored as desired. it will be appreciated that various sizes and shapes of the panels may be used to define different rear module appearances or other related functionality depending on the needs of the user. The side panels 58 may extend fore-and-aft along the rear rails 16*a*, and may be configured to mate at their front ends with the cabin module 12. Additional trim panels 60 may be attached to the rear end module 16 to define the overall size and shape of the rear end module 16 and ultimately the vehicle that is defined by the assembly of the modules. The various embodiments of the rear module 16 may be arranged such that one rear module may be replaced with another type of rear module for use with the same cabin module.

Thus, in view of the various modules with corresponding attachment interfaces, the rear end module 16 may be attached to the cabin module 12, and the front end module 14 may be attached to the cabin module. In one aspect, stubs from the cabin module 12 are received in recesses of the rear end module 16, and stubs from the cabin module 12 are also received in recesses of the front end module 14. Additional connection points may be made between mating structure of the rear module 16 and the cabin module 12, via SPR or element welding, or traditional welding between cooperative materials. As described above, various stub/recess interfaces may be modified or reversed among the mating modules, and that the stubs/recesses may also be referred to generally as attachment interfaces.

For example, additional connection points 80 (FIG. 1) may be disposed in the corresponding side panels and end panels of the cabin module 12, rear end module 16, and front end module 14. In one aspect, three points 80 are disposed on each lateral side of the rear module 16 that correspond to points on the cabin module 12 when the modules are mated. Similarly, in one aspect, three points 80 are disposed on each lateral side of the front end module 14 that correspond to points on the cabin module 12. These connection points may be SPR, element welding, bolts, or other mechanical attachment mechanisms. It will be appreciated that other attachment arrangements may also be used. Attachment point distribution may be determined based on expected loads via modeling or the like, and may vary depending on the ultimate needs of the vehicle. Corresponding structure at the location of the additional attachment points may be built up to increased thickness or stiffness in order to transfer loads or withstand additional loads at these locations.

Thus, in view of the above, various modules may constructed separately and may easily be attached to each other to create a variety of vehicles depending on the specific needs of the vehicle and/or user preference. In particular, in the case of electric vehicles, various cabin modules 12 may be designed, having different battery sizes to accommodate different ranges for electric vehicles. The frame structure of the vehicle may be a combination of all three modules 12, 14, 16, with each module including a portion of the vehicle frame that is assembled together to form the overall frame. If a vehicle with a different range and battery is desired, a different cabin module 12 may be attached to the front end module 14 and the rear end module 16, with the modules combining to define the overall shape of the vehicle and the overall structural frame. Similarly, for a given cabin module 12, different front modules 14 or rear modules 16 may be attached based on styling preference or functionality preference, such as additional cargo room.

The cabin module 12, by not including the front end and rear ends aspects of the vehicle (such as motors, axles, wheels, etc.), can therefore be smaller, lighted, and take up less storage space during manufacturing. Thus, a variety of battery sizes and cabin modules 12 may be constructed and attached to common front end modules 14 and common rear end modules 16.

However, in another aspect, the front end modules 14 and rear end modules 16 may also be different. For example, some rear end modules 16 may include a motor for driving the wheels, and other rear end modules 16 may include wheels that are not driven by a motor, but that roll in response to FWD from the front end module 14. Similarly, as described above, the front module 14 may not include a motor, and may instead include a cargo compartment, or other components.

Thus, it will be appreciated that various types of modules for each of the cabin module 12, front end module 14, and rear end module 16 may be used, thereby allowing the vehicle of the system 10 to have many different configurations. By locating the battery 26 as part of the cabin module 12, and in particular as the lower platform 20 of the cabin module 12, the desired range capability and/or appearance for an electric vehicle can be quickly and easily varied relative to given front and rear modules.

The wheels that may be disposed on the front module 14 and rear module 16 may be described as being modular relative to the cabin module 12, because the cabin module 12 does not include the wheels and can therefore be made smaller and lighter, and can therefore be easily selected for assembly with the front and rear modules that already include the wheels. Each module may also be described as self-supporting, meaning that they include the support structure described above, or other support structure, that enables the modules to be independently stored and assembled at various times.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:
1. A system for modular assembly of a vehicle, the system comprising:
   a cabin module of a vehicle having a first end and a second end;
   a front end module having a first end and a second end;
   a rear end module having a first and a second end;
   wherein the first end of the front end module defines a front end of the system, and the second end of the rear end module defines a rear end of the system;
   wherein the second end of the front end module is configured to securely mate with the first end of the cabin module;
   wherein the first end of the rear end module is configured to securely mate with the second end of the cabin module;
   wherein the cabin module includes a floor structure extending between the first and second end, and a plurality of panels extending upwardly from the floor structure;
   wherein the front end module includes a front support structure;
   wherein the rear end module includes a rear support structure;
   wherein the cabin module is securely attached to the front support structure and the rear support structure via attachment interfaces therebetween;

wherein the cabin module includes a battery for an electric vehicle;
wherein the battery is part of the floor structure.

2. The system of claim 1, wherein the panels are made of high pressure vacuum die cast aluminum.

3. The system of claim 1, wherein the cabin module includes a plurality of stubs extending forwardly and rearwardly therefrom, wherein the stubs are received in corresponding cavities of the front end module and the rear end module, respectively.

4. The system of claim 1, wherein the floor structure of the cabin module defines a bottommost portion of the system at the location of the cabin module.

5. The system of claim 1, wherein the front end module and rear end module are configured to include front wheels and rear wheels, respectively, wherein the front end module and rear end module are separate from each other, and wherein the cabin module joins the front end module to the rear end module.

6. The system of claim 1, wherein the cabin module includes windshield support structure.

7. A system for modular assembly of a vehicle, the system comprising:
a cabin module of a vehicle having a first end and a second end;
a front end module having a first end and a second end;
a rear end module having a first and a second end;
wherein the first end of the front end module defines a front end of the system, and the second end of the rear end module defines a rear end of the system;
wherein the second end of the front end module is configured to securely mate with the first end of the cabin module;
wherein the first end of the rear end module is configured to securely mate with the second end of the cabin module;
wherein the cabin module includes a floor structure extending between the first and second end, and a plurality of panels extending upwardly from the floor structure;
wherein the front end module includes a front support structure;
wherein the rear end module includes a rear support structure;
wherein the cabin module is securely attached to the front support structure and the rear support structure via attachment interfaces therebetween;
wherein the front support structure includes a pair of front rails extending in a fore and aft direction, a bumper beam extending laterally between the front rails, a rear beam extending laterally between the front rails, and a plurality of panels extending upwardly from at least the front rails; and wherein the rear support structure includes a pair of rear rails extending in a fore and aft direction, a rear bumper beam extending laterally between the rear rails, a lateral beam extending laterally between the rear rails, and a plurality of panels extending upwardly from at least the rear rails.

8. A method of assembling a modular vehicle system, the method comprising the steps of:
providing a cabin module having a front end and a rear end, wherein the cabin module includes a floor structure defining a bottom of the module vehicle system and a plurality of panels extending upwardly from the floor structure, wherein the cabin module include a battery for an electric vehicle;
providing a front end module having a front support structure, the front end module configured to include front wheels of the vehicle;
providing a rear end module having a pair of rear support structures, the rear end module configured to include rear wheels of the vehicle;
securely attaching a rear end of the front end module to the front end of the cabin module via a plurality of attachment interfaces;
securely attaching a front end of the rear end module to the rear end of the cabin module via a plurality of attachment interfaces;
wherein the cabin module, front end module, and rear module combine to define an overall frame structure of the system;
wherein the floor structure includes the battery.

9. The method of claim 8, wherein the cabin module does not include wheels, wherein the cabin module includes windshield support structure.

10. The method of claim 8, wherein one of the front module or the rear module includes a motor for driving the front wheels or rear wheels.

11. A modular electric vehicle comprising:
a cabin module having a front end and a rear end;
a front module having a front end and a rear end;
a rear module having a front end and a rear end;
wherein the cabin module, front module, and rear module are separate modules and are securely mated with each other via a plurality of attachment interfaces therebetween, wherein the front end of the cabin module mates with the rear end of the front module, and the rear end of the cabin module mates with the front end of the rear module;
wherein the cabin module includes a lower platform defining a passenger compartment, wherein the lower platform includes a battery of the electric vehicle;
wherein the separate front module and rear module each include wheels, such that the wheels are separate and modular relative to the cabin module.

12. The modular electric vehicle of claim 11, wherein the cabin module, front module, and rear module each include support structure such that each module is self-supporting.

13. The modular electric vehicle of claim 12, wherein the attachment interfaces include a stub projecting from one of the modules that is received in a recess of an adjacent module to fixedly secure the modules together.

14. The modular electric vehicle of claim 12, wherein the support structure of the cabin module attaches to the support structure of the front module and the rear module at respective attachment interfaces of the plurality of attachment interfaces.

15. The modular electric vehicle of claim 11, wherein the cabin module include windshield support structure.

16. A modular electric vehicle comprising:
a cabin module having a front end and a rear end;
a front module having a front end and a rear end;
a rear module having a front end and a rear end;
wherein the cabin module, front module, and rear module are separate modules and are securely mated with each other via a plurality of attachment interfaces therebetween, wherein the front end of the cabin module mates with the rear end of the front module, and the rear end of the cabin module mates with the front end of the rear module;
wherein the cabin module includes a lower platform defining a passenger compartment, wherein the lower platform includes a battery of the electric vehicle;

wherein the separate front module and rear module each include wheels, such that the wheels are separate and modular relative to the cabin module;

wherein the cabin module, front module, and rear module each include support structure such that each module is self-supporting;

wherein the support structure of the cabin module attaches to the support structure of the front module and the rear module at respective attachment interfaces of the plurality of attachment interfaces;

wherein the support structure of the rear module includes a pair of rear rails extending in a fore and aft direction connected via laterally extending support structure, wherein a plurality of panels extend upward from at least the rear rails.

17. The modular electric vehicle of claim 16, wherein the support structure of the front module includes a pair of front rails extending in the fore and aft direction connected via laterally extending support structure, and a plurality of panels extending upwardly from at least the front rails.

* * * * *